United States Patent
Whitehead

(10) Patent No.: US 10,046,338 B2
(45) Date of Patent: *Aug. 14, 2018

(54) CENTRIFUGAL LIQUID SEPARATING SYSTEM AND METHOD

(71) Applicant: Mark Harold Whitehead, Independence, MO (US)

(72) Inventor: Mark Harold Whitehead, Independence, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/417,690

(22) Filed: Jan. 27, 2017

(65) Prior Publication Data

US 2017/0320069 A1   Nov. 9, 2017

Related U.S. Application Data

(63) Continuation-in-part of application No. 15/148,091, filed on May 6, 2016.

(51) Int. Cl.
| | | |
|---|---|---|
| *B01D 45/08* | (2006.01) | |
| *B04C 3/06* | (2006.01) | |
| *B04C 9/00* | (2006.01) | |
| *B03C 1/28* | (2006.01) | |
| *B03C 5/02* | (2006.01) | |

(Continued)

(52) U.S. Cl.
CPC .............. *B04C 3/06* (2013.01); *B01D 45/08* (2013.01); *B01D 45/12* (2013.01); *B01D 45/14* (2013.01); *B01D 45/16* (2013.01); *B03C 1/288* (2013.01); *B03C 5/02* (2013.01); *B04C 9/00* (2013.01); *B01D 46/0086* (2013.01); *B01D 46/10* (2013.01); *B01D 46/444* (2013.01); *B03C 2201/18* (2013.01); *B03C 2201/20* (2013.01); *B04C 2009/001* (2013.01)

(58) Field of Classification Search
CPC .. B01D 45/16; B01D 46/0086; B01D 46/444; B01D 46/10; B01D 45/14; B01D 45/12; B01D 45/08; B04C 3/06; B04C 2003/006; B04C 2003/003; F02M 35/024; Y02T 10/47

See application file for complete search history.

(56) References Cited

U.S. PATENT DOCUMENTS

| | | | | |
|---|---|---|---|---|
| 5,224,604 A | * | 7/1993 | Duczmal | ............... B03C 1/023 |
| | | | | 209/12.2 |
| 6,355,178 B1 | * | 3/2002 | Couture | ............... B01D 45/16 |
| | | | | 210/223 |

(Continued)

*Primary Examiner* — Dung H Bui
(74) *Attorney, Agent, or Firm* — Mashburn Law Office, LLC; Donna Denise Mashburn Chapman

(57) ABSTRACT

A centrifugal liquid separating system broadly comprises an insert cartridge including a housing, an inlet, one or more flow guides, a stator, a compression nozzle, an expansion nozzle, and an outlet. The flow guides guide liquid flowing into the inlet past the stator into the compression nozzle. The stator induces a rotational vortex into the liquid flow. Liquid with heavier particles in the liquid flow is urged to the outside of the rotational vortex. Liquid with lighter particles and cleaner liquid is urged to the inside of the rotational vortex. The compression nozzle and the expansion nozzle are aligned to cooperatively form an annular liquid channel. The liquid with the heavier particles flows through the annular liquid channel and the liquid with the lighter particles and the cleaner liquid flows to the expansion nozzle to the outlet.

17 Claims, 4 Drawing Sheets

(51) Int. Cl.
*B01D 45/16* (2006.01)
*B01D 45/14* (2006.01)
*B01D 45/12* (2006.01)
B01D 46/00 (2006.01)
B01D 46/10 (2006.01)
B01D 46/44 (2006.01)

(56) References Cited

U.S. PATENT DOCUMENTS

2004/0256312 A1* 12/2004 Gomez .............. B01D 19/0052
    210/512.3
2007/0209334 A1* 9/2007 Conrad ................... A47L 5/28
    55/337
2008/0009402 A1* 1/2008 Kane ..................... B01D 45/14
    494/53
2010/0132656 A1* 6/2010 Doering .............. F02M 35/022
    123/198 E \* cited by examiner

CENTRIFUGAL LIQUID SEPARATING SYSTEM AND METHOD

RELATED APPLICATION

This application is a continuation-in-part of non-provisional application Ser. No. 15/148,091 filed on May 6, 2016, and entitled "CENTRIFUGAL AIR CLEANING SYSTEM AND METHOD". The '091 application claims priority to non-provisional application Ser. No. 14/591,196 filed on Jan. 7, 2015. The '196 application in turn claims priority to provisional application No. 61/947,090 filed on Mar. 3, 2014. The '091 application, the '196 application, and the '090 application are hereby incorporated by reference in their entireties.

SUMMARY

The present invention is a centrifugal liquid separating system constructed in accordance with embodiments of the present invention. The centrifugal liquid separating system broadly comprises a housing, an inlet, an outlet, one or more flow guides, a stator, a compression nozzle, an expansion nozzle, one or more mounting brackets, and a liquid extraction system. The centrifugal liquid separating system is positioned in a pipe or tube chamber. The flow guides guide liquid flowing through the tube chamber past the stator into a central flow chamber. The stator includes a number of fins having angular surfaces for inducing a rotating vortex in the liquid flow. The compression nozzle gradually narrows for gradually compressing the liquid to increase velocity of the liquid flow. The expansion nozzle extends into the end of the compression nozzle and gradually widens therefrom. The expansion nozzle and the compression nozzle cooperatively form an annular extraction channel therebetween. The mounting brackets secure or support the housing inside the pipe or tube chamber.

Liquid flowing into the inlet flows past the stator, which induces a rotating vortex in the liquid flow. Heavier liquid in the liquid flow is urged to the outside of the rotating vortex while lighter and cleaner liquid is urged to the inside of the rotating vortex. The heavier liquid is then forced through the annular extraction channel and then pumped through the liquid extraction system to one or more liquid process components. The lighter liquid continues through the expansion nozzle and to the pipe or tube chamber.

In one embodiment of the present invention, the centrifugal liquid separating system includes one or more liquid guides positioned inside of and/or outside of the compression nozzle. The liquid guides may be electromagnetically charged for attracting ions, liquids, particulates, and/or contaminants towards the annular extraction channel. The centrifugal liquid separating system may also include one or more magnets positioned around the compression nozzle near the liquid guides for inducing an electromagnetic charge between the liquid guides and the liquid and/or the compression nozzle and the liquid for enhancing the electromagnetic attraction therebetween. Alternatively, the liquid guides may be charged via an electronic power system. In yet another embodiment, the one or more magnets may be used without the liquid guides.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
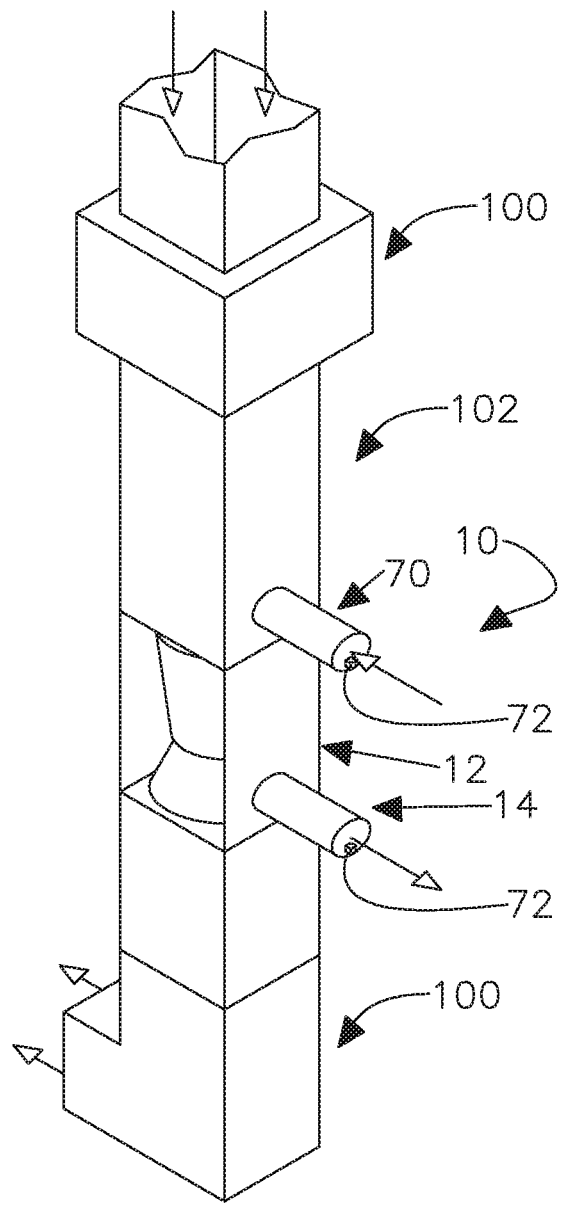
FIG. 1 is an perspective view of a centrifugal liquid separating system constructed in accordance with an embodiment of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
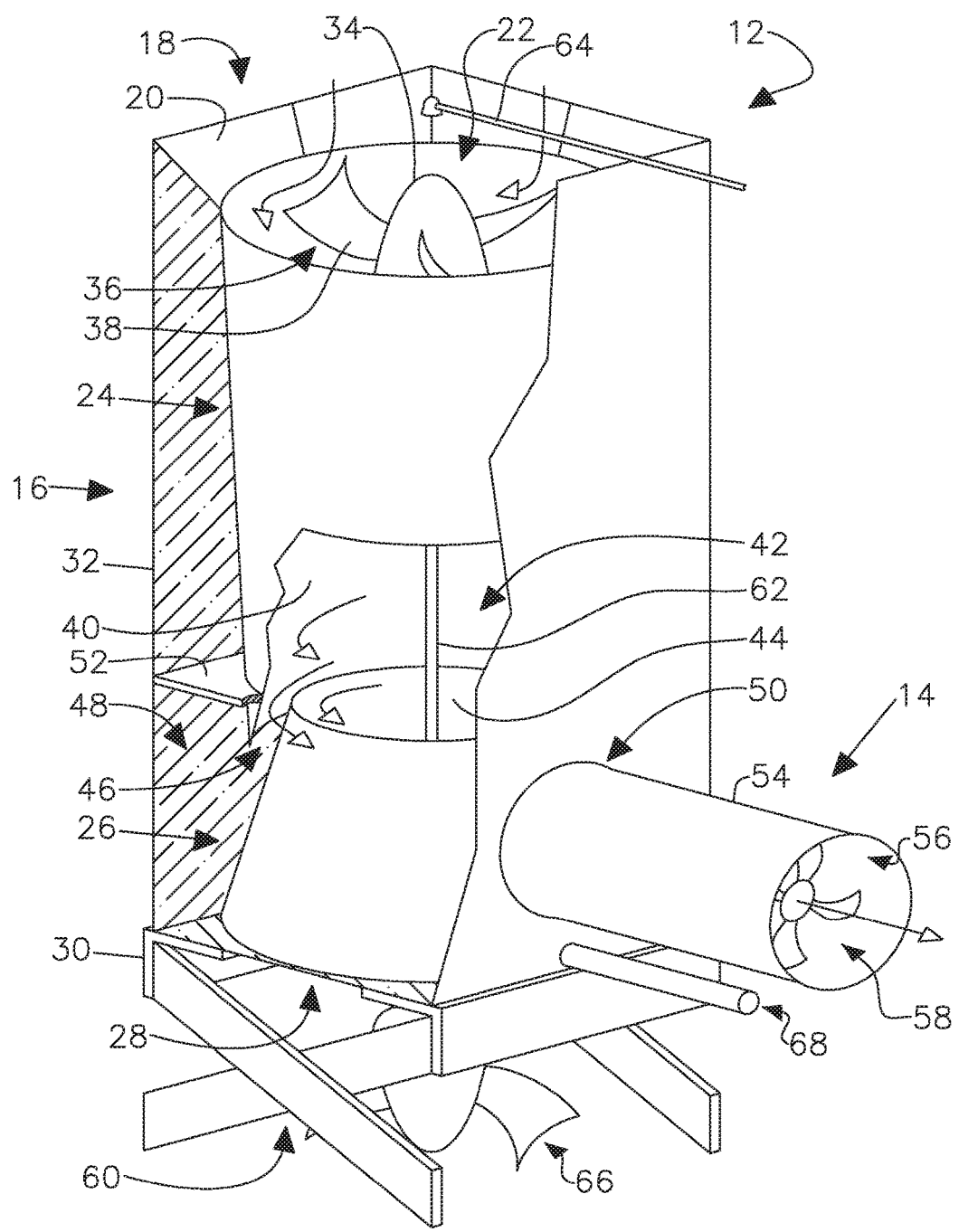
FIG. 2 is an enlarged perspective view of the centrifugal liquid separating system of FIG. 1.

Turning now to the drawing figures, and particularly FIGS. 1 and 2, a centrifugal liquid separating system 10 constructed in accordance with an embodiment of the present invention is illustrated. The centrifugal liquid separating system 10 broadly includes an insert cartridge 12 and an liquid extraction assembly 14.

The components of the insert cartridge 12 and the liquid extraction assembly 14 may be made of natural or synthetic materials e.g., metal, nylon, glass, or plastic, or any appropriate material or combination of inert materials to provide chemical resistance for a broad range of chemicals. In one embodiment, these components may be made of anti-microbial materials or any combination of anti-microbial materials, (e.g., copper, nickel, zinc, etc.) to enhance performance and prevent fluid contamination. The surface of these components may also be protectively coated with natural and synthetic rubber and plastics to meet various applications that are abrasive and corrosive. In another embodiment, the surface of these components may be coated with one or more anti-microbial materials.

The insert cartridge 12 induces a centrifugal vortex into the liquid flow and broadly comprises a housing 16, an inlet 18, one or more flow guides 20, a stator 22, a compression nozzle 24, an expansion nozzle 26, an outlet 28, and mounting brackets 30.

The housing 16 provides structural support and at least partially encloses the flow guides 20, stator 22, compression nozzle 24, and expansion nozzle 26 and may be formed of aluminum, steel, or any other suitable material. The housing 16 may be cylindrical or shaped similar to upstream or downstream processing components 100 (e.g., pumps, valves, tanks, filters, ultra-violet light treatment, ozone application, etc.) or connecting piping or tubing 102 and may include one or more sidewalls 32 for abutting an inner surface of the piping or tubing 102 and/or providing a structural base for the above components.

The inlet 18 receives liquid from the upstream processing components 100 via piping or tubing 102 and extends into the housing 16 from an upstream end of the insert cartridge. The inlet 18 may be circular, square, or other suitable shape for receiving liquid flow from a pipe or tube 102. The inlet 18 may be shaped as closely as possible to the shape of the piping or tubing 102 so that liquid flow is not instantaneously restricted at the inlet 18.

The flow guides 20 guide the liquid coming into the inlet 18 past the stator 22 into the compression nozzle 24 and gradually angle or curve inward from near the outside of the housing 16 to a beginning portion of the compression nozzle 24. The flow guides 20 may be angled slightly more than or less than or the same as the compression nozzle 24. The flow guides 20 may alternatively take any other shape that gradually changes from the shape of the piping or tubing 102 to the circular shape of the compression nozzle 24 or improves liquid flow between the piping or tubing 102 to the compression nozzle 24. The flow guides 20 may also be an indistinguishable upstream portion of the compression nozzle 24.

The stator 22 induces rotational flow in the liquid entering the compression nozzle 24 and may be stationary and positioned near the inlet 18 between the flow guides 20 and the compression nozzle 24. The stator 22 may be a fan-shaped component including a central hub 34 and one or more fins 36. The central hub 34 may be a curved conical shape or similar aerodynamic shape for minimizing the drag it induces into the flowing liquid. The angled fins 36 extend from the central hub 34 to the flow guides 20 and/or compression nozzle 24 and include angled surfaces 38 for directing the incoming liquid into a rotating vortex pattern.

The compression nozzle 24 guides the liquid from the stator 22 into a gradually tighter vortex and is connected to or extends from the flow guides 20 to just beyond the expansion nozzle 26. The compression nozzle 24 has a conical angled surface 40 that gradually narrows from the stator 24 to just beyond the expansion nozzle 26. The end of the compression nozzle 24 is slightly wider than the beginning of the expansion nozzle 26. The compression nozzle 24 forms a central flow chamber 42 through which the vortex of liquid flows. The flow guides 20 and/or the compression nozzle 24 may also include spiral ridges for mounting the stator 22 thereto.

The expansion nozzle 26 guides liquid from the central flow chamber 42 to the outlet 28 and extends from just inside the end of the compression nozzle 24 to the outlet 28. The expansion nozzle 26 has an angled surface 44 that gradually widens from just inside the end of the compression nozzle 24 to the outlet 28. The expansion nozzle 26 may be coaxially aligned with the compression nozzle 24. The beginning of the expansion nozzle 26 is slightly narrower than the end of the compression nozzle 24 so that the compression nozzle 24 and the expansion nozzle 28 cooperatively form an annular extraction channel 46 therebetween. The annular extraction channel 46 is substantially circular and allows heavier liquid to flow therethrough to an liquid collection chamber 48. The liquid collection chamber 48 surrounds the expansion nozzle 26 and at least part of the compression nozzle 24 and accumulates the heavier liquid from the annular extraction channel 46 before the heavier liquid continues to the liquid extraction assembly 14. The liquid collection chamber 48 includes an opening 50 in the housing 16 for the liquid to flow to the liquid extraction assembly 14. The liquid collection chamber 48 may be at least partially enclosed by one or more vacuum baffles 52 connected to the outside of the compression nozzle 24 and the housing 16 to retain liquid in the liquid collection chamber 48. The vacuum baffles 52 may also serve to stabilize or support the compression nozzle 24.

The outlet 28 allows liquid cleaned by the system 10 to continue flowing downstream into the pipe or tube 102 and may be circular, square, or other suitable shape for allowing liquid to flow back into the piping or tubing 102. It is not as important for the outlet 28 to gradually conform to the shape of the piping or tubing 102 as much as the inlet 18 because the cross section of the liquid flow is increasing at the outlet 28, but doing so still improves overall liquid flow through the piping or tubing 102.

The mounting brackets 30 secure the housing 16 to the piping or tubing 102 and may be angle irons, studs, beams, or any other type of mounting member. The mounting brackets 30 may include fasteners for attaching the housing 16 to the mounting brackets 30 or may simply support the housing 16. Alternatively, the housing 16 may be welded or bonded, using epoxy, resin, or any other adhesive material, to the mounting brackets 30. The mounting brackets 30 may also be fastened, bonded, or welded to the piping or tubing 102.

The liquid extraction assembly 14 removes heavier liquid, as described below, and broadly includes a liquid pipe 54 and one or more liquid processing components 58.

The liquid pipe 54 guides the heavier liquid to one or more liquid processing components 58 and is connected to the housing 16 at the opening 50. The liquid pipe 54 may be formed of standard piping or tubing and forms a liquid flow chamber 56 therethrough.

The one or more processing components 58 are located downstream from the liquid extraction assembly 14 and process or store the separated ions, liquids, particulates, and contaminants. The processing components 58 broadly include one or more of the following: storage containers, gravity tanks, accumulators, axial or non-axial pumps or other mechanical pumps, valves, filters, ultra-violet light treatment, ozone application, or another liquid processing system. For example, the mechanical pump can be used to quickly draw the heavier liquid through the annular extraction channel 46 and into a storage container.

The centrifugal liquid separating system 10 operates as follows: first, the liquid enters the separating system 10 via the inlet 18. The flow guides 20 then guide the liquid through past the stator 22 into the compression nozzle 24. If the piping or tubing 102 is not circular, the flow guides 20 convert the liquid flow in the piping or tubing 102 to a circular liquid flow profile. The stator 22 induces a rotational vortex in the liquid flow via the angled surfaces 38 of the fins 36 as the liquid enters the central flow channel 42. Heavier liquid including larger particulates and debris particles will be urged to the outermost portion of the vortex while lighter liquid with smaller particles and cleaner liquid will tend to remain in the innermost portion of the vortex due to centrifugal interactions between the differently weighted liquid. The conical angled surface 40 of the compression nozzle 24 reduces turbulent flow and the buildup of eddy currents and compresses the liquid flow into a smaller flow profile. The compression due to the reduced flow profile linearly increases flow velocity which increases the centrifugal effect. The compression also encourages interaction between the liquid particles and thus encourages the heavy liquid and lighter liquid organization as described above.

The heavier liquid including the larger particulate and debris particles is separated from the lighter liquid by continuing through the annular extraction channel 46. The heavier liquid then enters the liquid collection chamber 48, flows through the liquid flow chamber 56 of the liquid pipe 54 to one or more liquid processing components 58. The lighter liquid including the smaller particles and cleaner liquid continues through the expansion nozzle 26, through the outlet 28, and flows into the pipe or tube chamber 102. In one embodiment, the lighter liquid flows out of the expansion nozzle 26 and into one or more downstream processing components 100 that further process or store the separated lighter liquid.

Figure 3:
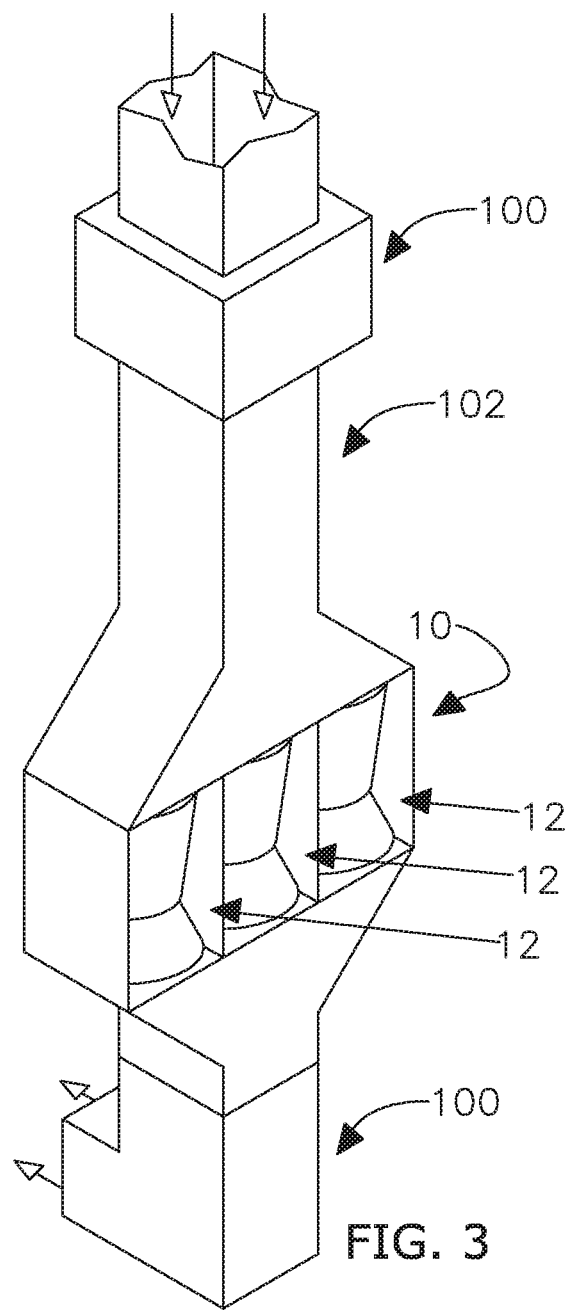
FIG. 3 is a perspective view of a centrifugal liquid separating system constructed in accordance with another embodiment of the present invention.

In an additional embodiment, as shown in FIG. 3, a number of insert cartridges 12 are mounted side by side in the piping or tubing 102. The liquid collection chambers 48 of the insert cartridges 12 may be isolated or may be combined as one.

Turning again to FIG. 2, in yet another embodiment, for high volume flow requirements, cross braces 60 and an axial stator shaft 62 may be attached to the mounting brackets 30 with the cross braces 60 extending to and supporting the compression nozzle 24 and the expansion nozzle 26 and the axial stator shaft 62 extending to and supporting the central hub 34 of the stator 22.

In yet another embodiment, a pump 66 may be positioned downstream from the expansion nozzle 28 to create negative pressure in the central flow chamber 42 and promote liquid flow from the inlet 18 to the outlet 28.

In yet another embodiment, as shown in FIG. 1, an extraction return liquid pipe 70 connects the piping or tubing 102 to the liquid pipe 54. The extraction return liquid pipe 70 is connected to the pipe or tube 102 upstream from the insert cartridge 12 for recirculating liquid separated via the liquid extraction assembly 14 back into the liquid flow for re-treatment. Recirculation of the extracted liquid can enhance ion, particulate, and liquid separation.

In yet another embodiment, one or more sensors 72 may be positioned in the liquid pipe 54, the extraction return liquid pipe 70, and/or other liquid flow positions for monitoring the performance of the centrifugal liquid separating system 10. The sensors 72 may be liquid flow sensors for monitoring liquid temperature, pressure, or speed; chemical sensors for detecting harmful particles or chemical composition; or any other suitable sensors.

The above-described centrifugal liquid separating system 10 can remove harmful particles and ions from waste or drinking water and can separate and extract liquids with different specific gravities or molecular weights. The separated and extracted particles, ions, and liquids can be stored, re-circulated, filtered, or treated with an additional liquid separation system. For example, in one embodiment, the centrifugal liquid separating system 10 may comprise a series of two or more centrifugal liquid separating systems 10 wherein the lighter liquid flowing out of one separating system 10 flows downstream into one or more additional separating systems 10. The series of two or more centrifugal liquid separating systems 10 may be utilized to significantly increase liquid separation and extraction. Additionally, the series of two or more centrifugal liquid separating systems 10 may include one or more processing components 100.

Figure 4:
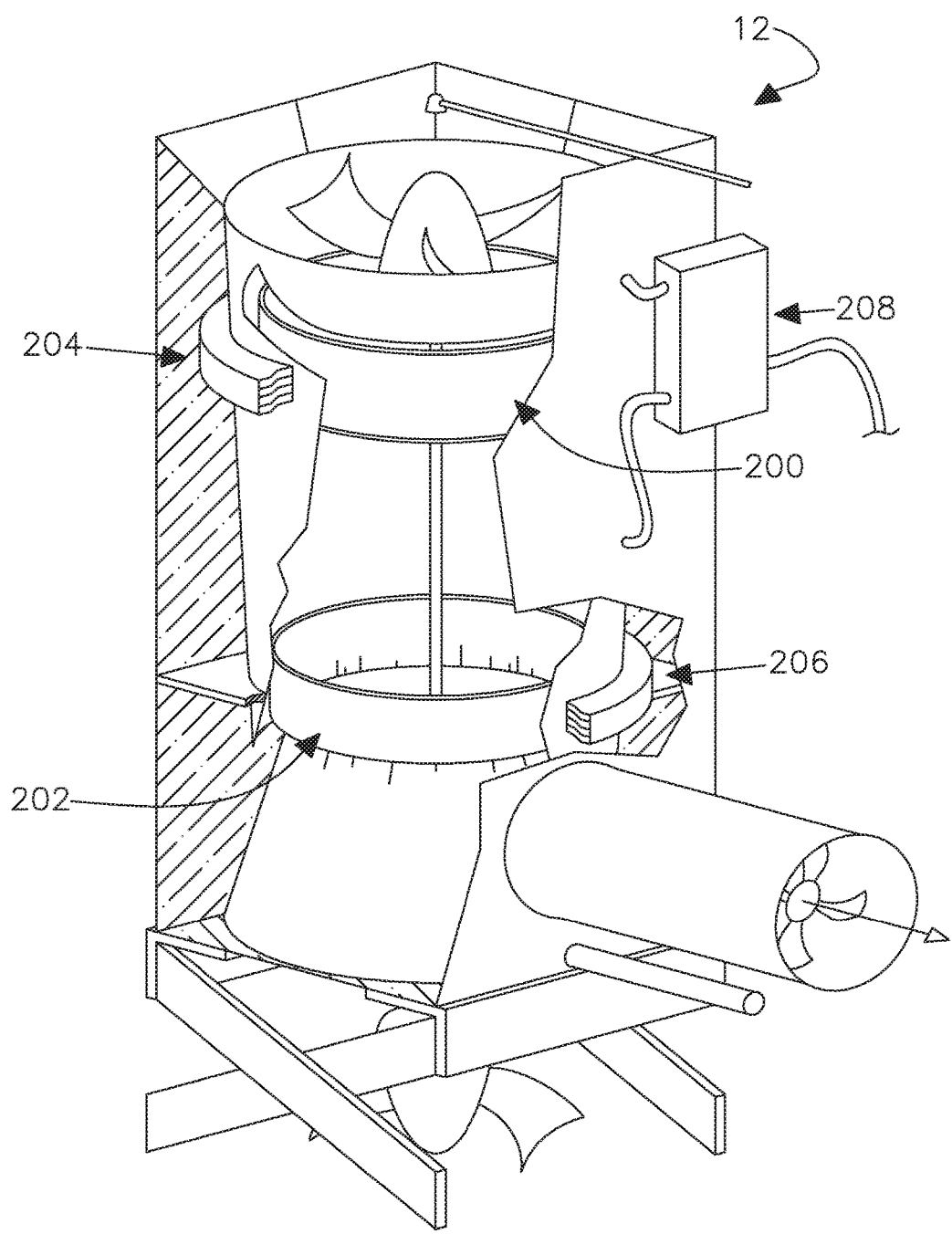
FIG. 4 is an enlarged perspective view of a centrifugal liquid separating system constructed in accordance with another embodiment of the invention.

Turning to FIG. 4, in an additional embodiment of the present invention, the insert cartridge 12 of the centrifugal liquid separating system 10 further comprises one or more liquid guides 200, 202. Inlet liquid guide 200 and a gap liquid guide 202 electrostatically attract or guide contaminants, ions, particles, etc. towards the annular extraction channel 46. The inlet liquid guide 200 and gap liquid guide 202 may be protectively coated with natural or synthetic materials to meet various applications that are abrasive and corrosive. Alternatively, the one or more liquid guides 200, 202 may be coated with anti-microbial materials.

The inlet liquid guide 200 may be a circular ring positioned near the first end of the compression nozzle 24 in the central flow channel 42 and may be formed of ferrous sheet metal or other suitable material. For example, in one embodiment, the inlet liquid guide 200 may be spaced approximately one inch from the central hub 34 and may be spaced approximately one inch from the interior surface of the first end of the compression nozzle 24.

The gap liquid guide 202 may be a circular ring positioned near the second end of the compression nozzle 24 or otherwise spaced from the inlet liquid guide 200 and may be at least partially positioned in the annular extraction channel 46. The gap liquid guide 202 may have a smaller diameter than the inlet liquid guide 200.

The insert cartridge 12 of the centrifugal liquid separating system 10 may further comprise one or more permanent magnets for electronically attracting contaminants, e.g., ions, particulates, or liquids towards and into the annular extraction channel 46. For example, a first permanent magnet 204 and a second permanent magnet 206 are shown in FIG. 4. The one or more permanent magnets 204, 206 may be located anywhere along the inside surface and/or the outside surface of the compression nozzle 24 or the expansion nozzle 26.

In one embodiment, the first permanent magnet 204 may be a toroidal ring or other magnet or magnet assembly and may be positioned near the first end of the compression nozzle 24. The first permanent magnet 204 may have a larger diameter than the first end of the compression nozzle 24 and may be positioned around the first end of the compression nozzle 24. For example, the first permanent magnet 204 may be longitudinally and concentrically aligned with the inlet liquid guide 200.

The second permanent magnet 206 may be a toroidal ring or other magnet or magnet assembly and may be spaced from the first permanent magnet 204 and positioned near the second end of the compression nozzle 24. The second permanent magnet 206 may have a larger diameter than the second end of the compression nozzle 24 and may be positioned around the second end of the compression nozzle 24. For example, the second permanent magnet 206 may be longitudinally and concentrically aligned with the gap liquid guide 202. The permanent magnet rings 204, 206 may be oriented so as to be magnetically attracted to each other.

In use, the inlet liquid guide 200 and the gap liquid guide 202 aerodynamically guide the high velocity liquid stream close to the wall of the compression nozzle 24. The inlet liquid guide 200 and the gap liquid guide 202 also induce liquid friction charging of the wall of the compression nozzle 24 and contaminants and particles in the liquid stream. As the liquid charges, ionized contaminants and particles are attracted to the oppositely charged wall of the compression nozzle 24 and are drawn into the annular extraction channel 46. This effect is improved if the inlet liquid guide 200 and the gap liquid guide 202 (and other components of the insert cartridge 12) are formed of high density polyethylene.

The electromagnetic effects enhance extraction to include progressive reduction of contaminants located in the liquid stream. Heavy and light particles and ionized contaminants with ionization potential below twenty electron volts are extracted. For example, petroleum derivatives, radioactive material, biological contaminants, and other hazardous industrial chemicals are removed.

The permanent magnets 204, 206 improve the separation of ionized particles and contaminants with the addition of the magnetic field in the liquid stream. Alternatively, the permanent magnets 204, 206 may be used without the inlet liquid guide 200 and the gap liquid guide 202.

In yet another embodiment, the inlet liquid guide 200 and the gap liquid guide 202 may be electronically energized via a power source 208 such as a 600 volt (or less) DC power supply or other suitable power supply. The inlet liquid guide 200 and the gap liquid guide 202 may be oppositely charged and may have their charges reversed via simple electronic controls or circuit set-up. Inducing the electronic charge via the power source 208 may increase extraction of various liquids, contaminants, and particles in heated environments and applications.

The above described embodiments provide a number of synergistic improvements. The liquid guides 200, 202 and the magnets 204, 206 and/or electronic energizing power source create a dipole toroidal magnetic field, which accelerates ion contaminant movement towards the annular extraction channel 46. The charged inlet liquid guide 200 and the gap liquid guide 202 also create a low friction electrostatic liquid foil that increases the extraction of ionized particles, and positive and negative contaminants from the liquid stream. For example, the electromagnetic force can efficiently separate and remove charged molecules from the liquid flow based on the low potential and magnetic susceptibility of each molecule.

Further, the vortex geometry of the above described embodiments causes each atom, molecule, or particle within the rotating liquid flow to have an incremental flow direction, electronic charge, and velocity. Each spiraling charged atom, molecule, or particle in the vortex forms a dynamic toroidal magnetic field, generating an electrically charged plasma vortex. Paramagnetic atoms, molecules, or particles (e.g., oxygen atoms and molecules) in the plasma vortex are pulled toward the center of the liquid flow, and diamagnetic atoms, molecules, or particles (e.g., carbon atoms and radioactive particles) are pushed to the outside of the liquid flow and toward the annular extraction channel 46. In one embodiment, electrically charged carbon monoxide and carbon dioxide molecules in the liquid flow dissociate as they spiral within the plasma vortex to dramatically increase the oxygen content of liquid flowing out of the expansion nozzle 26.

Thus, the centrifugal, electrostatic, and electromagnetic forces synergize to cooperatively separate and remove atoms, molecules, particles, and other contaminants from a liquid mixture as it flows through the embodiments of the present invention. The above-described invention embodiments can be used in waste water treatment facilities, drinking water treatment plants, industrial facilities, and any other area where liquid purification, separation, or extraction is desired.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A centrifugal liquid separating system comprising:
   an insert cartridge comprising:
      a housing;
      an inlet for receiving a liquid flow having relatively heavy particles and relatively light particles;
      a stator positioned near the inlet for inducing a rotational vortex in the liquid flow;
      a compression nozzle including a first end near the stator, a conical angled surface, and second end opposite the first end, the conical angled surface forming a central flow channel and configured to increase the velocity of the liquid flow through the central flow channel;
      an expansion nozzle including a first end near the second end of the compression nozzle, a conical angled surface; and a second end opposite the first end of the expansion nozzle, the first end of the expansion nozzle being smaller in diameter than the second end of the compression nozzle so as to form an annular extraction channel;
      an outlet opposite the inlet near the second end of the expansion nozzle;
      an inlet liquid guide positioned in the central flow channel near the first end of the compression nozzle, wherein the inlet liquid guide is a circular ring having a smaller diameter than the first end of the compression nozzle, wherein the inlet liquid guide and the gap liquid guide are spaced from the interior surface of the compression nozzle; and
      a gap liquid guide positioned in the central flow channel near the second end of the compression nozzle, wherein the gap liquid guide is a circular ring having a smaller diameter than the second end of the compression nozzle,
      wherein the heavier particles in the liquid flow are urged to the outside of the rotational vortex and the lighter particles in the liquid flow are urged to the inside of the rotational vortex so that liquid with the heavier particles on the outside of the rotational vortex flows through the annular extraction channel and liquid with the light particles on the inside of the rotational vortex flow through the expansion nozzle and the outlet, the inlet liquid guide and the gap liquid guide being configured to attract contaminants and particles towards the annular extraction channel.

2. The centrifugal liquid separating system of claim 1, wherein the inlet liquid guide and the gap liquid guide are made of polyethylene.

3. The centrifugal liquid separating system of claim 1, wherein the gap liquid guide is positioned at least partially in the annular extraction channel.

4. The centrifugal liquid separating system of claim 1, wherein the gap liquid guide is made of ferrous material.

5. The centrifugal liquid separating system of claim 1, wherein the gap liquid guide has a smaller diameter than the inlet liquid guide.

6. The centrifugal liquid separating system of claim 1, wherein the inlet liquid guide is made of ferrous material.

7. The centrifugal liquid separating system of claim 1, wherein the inlet liquid guide and the gap liquid guide are configured to be electronically charged via a power source for attracting ionized contaminants towards the annular extraction channel.

8. A centrifugal liquid separating system comprising:
an insert cartridge comprising:
a housing;
an inlet for receiving a liquid flow having relatively heavy particles and relatively light particles;
a stator positioned near the inlet for inducing a rotational vortex in the liquid flow;
a compression nozzle including a first end near the stator, a conical angled surface, and second end opposite the first end, the conical angled surface forming a central flow channel and configured to increase the velocity of the liquid flow through the central flow channel;
an expansion nozzle including a first end near the second end of the compression nozzle, a conical angled surface; and a second end opposite the first end of the expansion nozzle, the first end of the expansion nozzle being smaller in diameter than the second end of the compression nozzle so as to form an annular extraction channel;
an outlet opposite the inlet near the second end of the expansion nozzle;
at least one magnetic ring positioned around the compression nozzle;
an inlet liquid guide positioned in the central flow channel inside the first end of the compression nozzle, wherein the inlet liquid guide is a circular ring having a smaller diameter than the first end of the compression nozzle, wherein the inlet liquid guide and the gap liquid guide are spaced from the interior surface of the compression nozzle; and
a gap liquid guide positioned in the central flow channel at least partially inside the compression nozzle and near the second end of the compression nozzle, wherein the gap liquid guide is a circular ring having a smaller diameter than the second end of the compression nozzle,
wherein the heavier particles in the liquid flow are urged to the outside of the rotational vortex and the lighter particles in the liquid flow are urged to the inside of the rotational vortex so that liquid with the heavier particles on the outside of the rotational vortex flows through the annular extraction channel and liquid with the light particles on the inside of the rotational vortex flow through the expansion nozzle and the outlet, the inlet liquid guide, the gap liquid guide and the magnetic ring being configured to attract contaminants towards the annular extraction channel.

9. The centrifugal liquid separating system of claim 8, wherein the magnetic ring is positioned near the first end of the compression nozzle.

10. The centrifugal liquid separating system of claim 9, wherein the inlet liquid guide is longitudinally aligned with the magnetic ring near the first end of the compression nozzle.

11. The centrifugal liquid separating system of claim 8, wherein the magnetic ring is positioned near the second end of the compression nozzle.

12. The centrifugal liquid separating system of claim 11, wherein the gap liquid guide is longitudinally aligned with the magnetic ring near the second end of the compression nozzle.

13. The centrifugal liquid separating system of claim 8, wherein the gap liquid guide is positioned at least partially in the annular extraction channel.

14. The centrifugal liquid separating system of claim 8, wherein the magnetic ring comprises two magnetic rings spaced from each other.

15. The centrifugal liquid separating system of claim 8, wherein the two magnetic rings are oriented so as to be magnetically attracted to each other.

16. The centrifugal liquid separating system of claim 8, wherein the inlet liquid guide and the gap liquid guide are made of ferrous material.

17. A centrifugal liquid separating system comprising:
an insert cartridge comprising:
a housing;
an inlet for receiving a liquid flow having relatively heavy particles and relatively light particles;
a stator positioned near the inlet for inducing a rotational vortex in the liquid flow;
a compression nozzle including a first end near the stator, a conical angled surface, and second end opposite the first end, the conical angled surface forming a central flow channel and configured to increase the velocity of the liquid flow through the central flow channel;
an expansion nozzle including a first end near the second end of the compression nozzle, a conical angled surface; and a second end opposite the first end of the expansion nozzle, the first end of the expansion nozzle being smaller in diameter than the second end of the compression nozzle so as to form an annular extraction channel;
an outlet opposite the inlet near the second end of the expansion nozzle;
an inlet liquid guide positioned near the first end of the compression nozzle in the central flow channel, wherein the inlet liquid guide is a circular band having a smaller diameter than the first end of the compression nozzle, wherein the inlet liquid guide and the gap liquid guide are spaced from the interior surface of the compression nozzle;
a gap liquid guide positioned near the second end of the compression nozzle and at least partially in the annular extraction channel wherein the gap liquid guide is a circular band having a smaller diameter than the second end of the compression nozzle;
a first magnetic ring positioned around the first end of the compression nozzle and longitudinally aligned with the inlet liquid guide; and
a second magnetic ring positioned around the second end of the compression nozzle and longitudinally aligned with the gap liquid guide, wherein the heavier particles are urged to the outside of the rotational vortex and the lighter particles are urged to the inside of the rotational vortex so that liquid with the heavier particles on the outside of the rotational vortex flows through the annular extraction channel and liquid with the light particles on the inside of the rotational vortex flow through the expansion nozzle and the outlet, the magnetic rings and the inlet liquid guide and the gap liquid guide cooperatively being configured to attract contaminants towards the annular extraction channel.

* * * * *